B. W. KADEL ET AL
TRUCK FOR RAILWAY ROLLING STOCK
Nov. 24, 1931.
Re. 18,266
Original Filed Dec. 3, 1927 4 Sheets-Sheet 1
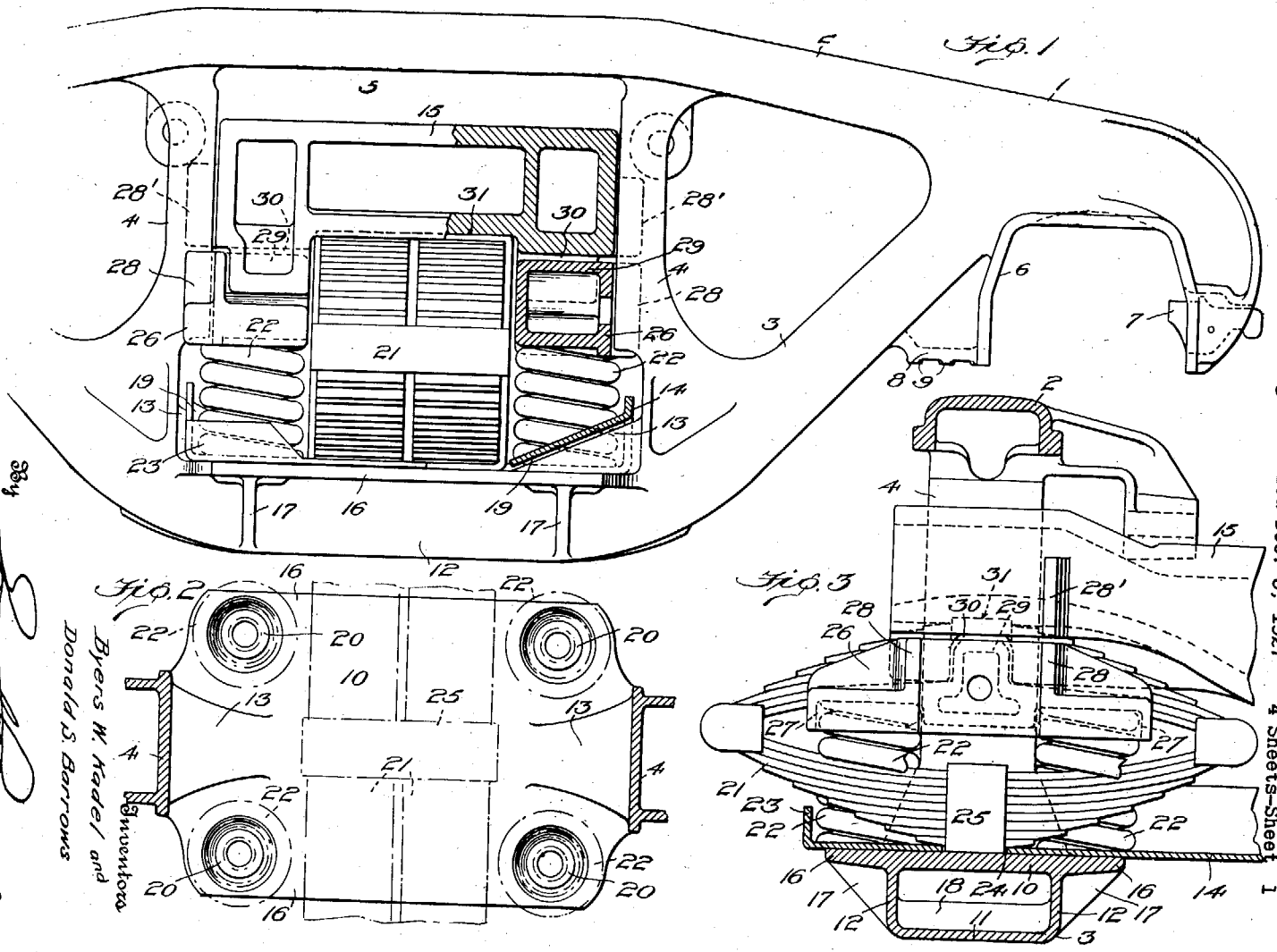
Inventors
Byers W. Kadel and
Donald S. Barrows
By Frank L. Mechlin
Attorney

B. W. KADEL ET AL

TRUCK FOR RAILWAY ROLLING STOCK

Nov. 24, 1931.

Original Filed Dec. 3, 1927

Re. 18,266

4 Sheets-Sheet 2

Inventors

Byers W. Kadel and

Donald S. Barrows

By

Attorney

B. W. KADEL ET AL

TRUCK FOR RAILWAY ROLLING STOCK

Nov. 24, 1931.

Re. 18,266

Original Filed Dec. 3, 1927 4 Sheets-Sheet 3

Inventors
Byers W Kadel and
Donald S. Barrows

By

Attorney

B. W. KADEL ET AL

TRUCK FOR RAILWAY ROLLING STOCK

Nov. 24, 1931.

Original Filed Dec. 3, 1927

Re. 18,266

4 Sheets-Sheet 4

Inventors
Byers W. Kadel and
Donald S Barrows

By

Attorney

Reissued Nov. 24, 1931

Re. 18,266

UNITED STATES PATENT OFFICE

BYERS W. KADEL, OF BALTIMORE, MARYLAND, AND DONALD S. BARROWS OF ROCHESTER, NEW YORK

TRUCK FOR RAILWAY ROLLING STOCK

Original No. 1,727,886, dated September 10, 1929, Serial No. 237,442, filed December 3, 1927. Application for reissue filed October 17, 1931. Serial No. 569,528.

This invention relates to trucks for railway rolling stock and more particularly to the construction of the side frames, bolsters and spring planks thereof as well as the arrangement of the bolster springs disposed between said frames and bolsters for supporting the latter.

The principal object of our invention, generally considered, is the improvement in trucks for railway rolling stock and particularly the side frames, bolsters, spring planks, spring plates and the arrangement and construction of the bolster springs whereby increased capacity is secured.

An object of our invention is to provide car trucks formed with side frames in which the tension member between the bolster guide columns is preferably, though not necessarily, reinforced at the critical points adjacent the junctions with the bolster guide columns as well as rigidly supported and strengthened by reinforcing portions extending upwardly from near the center of the spring plank seat portion diagonally upwardly and outwardly past the bolster guide columns toward each end of the frame, the upper web of the tension member between the bolster guide columns being laterally widened to support a nest of springs of relatively great capacity, said springs for that purpose preferably comprising both elliptic and helical springs, said elliptic springs being disposed between the reinforcements or centrally of the spring supporting portion of the tension member and the helical springs being preferably disposed on either side of the elliptic springs and transversely spaced so as to clear the reinforcements between the spring supporting portion and the bolster guide columns.

Another object of our invention is to provide a car truck formed with integral side frames preferably comprising a plurality of truss structures, at least one of said structures having inclined portions meeting substantially on the transverse center line of said side frame and at least one of the other trusses having the inclined portions disposed beyond the window opening in the frame, said first truss portions thereby cutting across corners of the window opening and the upper web of the tension member beneath said opening being widened for supporting bolster springs and a nest of springs supported on said widened portion of the tension member and comprising a main group of elliptic springs and auxiliary helical springs disposed on opposite sides of said elliptic springs, said helical springs being preferably of such a height that they are not stressed until the elliptic springs have been compressed a predetermined amount.

A further object of our invention is the provision of a car truck with integral side frames and bolster springs involving a combination of elliptic and helical springs whereby increased capacity is secured so that the truck is admirably adapted for use with cars of the type used as tenders for locomotives.

A still further object of our invention is the provision of a side frame provided with horizontal, preferably corrugated webs adjacent the ends thereof adapted to serve as jacking pads.

An additional object of our invention is to provide a novel spring grouping for bolster springs involving preferably a plurality of sets of transversely disposed elliptic springs adapted to be positioned centrally of the spring supporting portion of an associated side frame and a pair of transversely spaced helical spring units disposed on either side of said elliptic springs, said helical springs, if desired, being so short that they do not come into action until the elliptic springs have been stressed a predetermined amount, whereby their capacity is substantially reserved for unusual stresses.

Another object of our invention is the provision of a car truck formed with side frames having tension members with upper laterally widened webs for supporting bolster springs, said springs comprising transversely disposed elliptic springs and transversely spaced helical spring units on either side of said elliptic springs, the distance between each pair of helical spring units being bridged by spring caps and a bolster supported on said elliptic springs and helical spring caps and so constructed that interlocking engagement is provided with respect to the spring caps.

Other objects and advantages of the invention relating to the particular arrangement and construction of the various parts will become apparent as the description proceeds.

Referring to the drawings illustrating our invention, the scope whereof is defined by the appended claims,—

Figure 1 is a partial side elevation of a truck particularly showing a portion of a side frame thereof with its associated spring plank, bolster and nest of springs.

Figure 2 is a plan of the spring plank seat portion of the frame showing a preferred manner of placing the elliptic and helical springs with respect to a preferred design of frame having auxiliary reinforcements between the lower ends of the bolster guide columns and the spring supporting portion of the frame.

Figure 3 is a central transverse sectional view of the frame particularly illustrating the manner in which the bolster is supported by the nest of springs employed.

Figure 4:
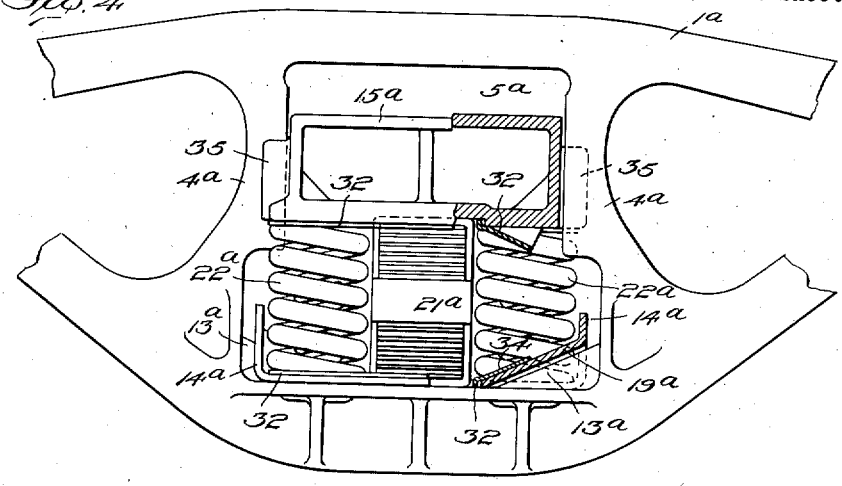
Figure 4 is a partial side elevation of a truck, as in Figure 1, but showing a modification.

Referring to the drawings in detail, like parts being designated by like reference characters, and first considering the embodiment of our invention illustrated in Figs. 1, 2 and 3, there is shown a portion of a truck comprising a side frame 1, preferably formed of cast steel, although it will be obvious that certain advantages of our invention may be obtained when using frames of other than cast construction. Said frame 1 comprises a compression member 2, tension member 3, and bolster guide columns or strut portions 4 spacing intermediate portions of said compression and tension members leaving a window opening 5 therebetween. The compression and tension members in the present embodiment are shown joined to each other and to a jaw-shaped portion 6 adjacent each end of the frame, which portions 6 are adapted to embrace and be connected to associated journal boxes, not shown, retainers 7 being preferably employed in this connection, or, if desired, journal boxes may be integrally connected to the ends of said frame. Those portions of the frame between the inner sides of the jaws and the adjacent inclined end portions of the tension member are preferably provided with horizontally disposed web portions 8, the lower surfaces of which are desirably ribbed or corrugated as indicated at 9 to serve as jacking pads.

The tension member 3 between the bolster columns 4 is preferably generally box-shaped in cross-section and comprises an upper web 10 forming a spring plank seat portion, a lower web 11 and side webs 12. For rigidifying and strengthening the side frame and particularly the tension member and the junctions between the tension member and bolster guide columns, said tension member is preferably upwardly convoluted or embossed along the longitudinal center line of the frame adjacent the junctions with the bolster guide columns to form upper diagonally disposed web portions 13 which start near the center of the spring plank seat portion or upper web of the tension member and extend diagonally upward through the bolster guide columns towards the ends of the frame in a manner similar or identical to that disclosed in the patent of Donald S. Barrows, No. 1,652,808, dated December 13, 1927. This construction results, in effect, in a bifurcation of the upper web portion of the tension member producing triangular or inclined reinforcements at the junctions between the tension member and bolster guide columns and in addition forms embossments with which the spring plank 14 is adapted to engage, thereby obviating the necessity of the usual squaring lugs which, however, may be employed if desired.

This reinforcement 13 also has the effect of reducing the effective depth of the window opening 5 for the insertion of the bolster 15, thereby making it desirable to decrease the height of the front or outer guide lugs, or eliminating them entirely as in the preferred embodiment now being described, so that the bolster may be inserted and withdrawn without difficulty. The rear or inner bolster guides may be of greater depth, if desired.

For providing adequate spring supporting area, the upper web 10 between the bolster guide columns forming the spring plank seat portion is laterally extended beyond the webs 12 as indicated at 16. These extensions are preferably braced with respcet to the webs 12 by triangular gusset portions 17. The webs of the box-shaped portion of the tension member may be likewise braced interiorly by web or gusset portions 18, as shown most clearly in Figure 3.

Considering the tension member 3, it will be seen that the main portion thereof is substantially horizontal between the bolster guide columns 4 on its upper portion and curved at its lower portion beneath the bolster guide columns. This portion also decreases in depth from the center towards the ends thereof. The spring plank seat portion or upper web 10 is extended diagonally upward from the sides of the window opening 5 toward the ends of the frame, the lower web 11 curving beneath the bolster guide columns and extending diagonally upwardly and slightly converging with respect to the diagonal portion of the upper web 10.

The extreme upper portions 13 of the tension member or those portions convoluted, bifurcated or branching from the main web 10 adjacent the central portions are preferably of less width than the main portion of the tension member and may be of a width corresponding approximately to that of the bolster guide columns at the upper or outer ends and as illustrated may be tapered or decreased in width slightly toward the inner ends. Although these portions are shown adjacent the longitudinal center line of the frame, they may be formed as two transversely spaced portions extending upwardly and outwardly and spring units now positioned on either side thereof may be disposed therebetween. On account of the reinforcements 13, the area of the spring supporting portion 10 of the tension member effective for supporting the bolster springs is decreased and it is necessary to similarly convolute the spring plank 14 so that it will properly nest on the spring supporting portion of the frame. When the spring plank 14 is thus correspondingly convoluted or embossed, as indicated at 19, interlocking engagement is provided because the embossments 19 in the plank fit over the reinforcements 13 of the frame and hold the plank in squared relation with respect to the frame, even without the squaring lugs 20.

In the present embodiment we have shown a nest of springs employed in which the capacity thereof is increased by using elliptic or leaf springs as well as helical or coil springs. Said nest of springs comprises a plurality or pair of elliptic spring sets 21 disposed transversely of the frame and preferably centrally positioned with respect to the spring plank seat portion and a pair of helical spring units 22 disposed on either side thereof and transversely spaced so as to clear the reinforcements 13.

Each spring unit 22 may be of the usual double coil type or, if less capacity is desired, single coils only need be employed. Each spring unit 22 may be centered by fitting over a squaring collar on an associated spring plate such as described in connection with the Barrows patent, No. 1,652,808 heretofore referred to, or the outer spring unit may be retained in place by flanges or gusset portions 23 on the ends of the spring plank, the sides of said spring plank, and the upwardly corrugated or embossed portions thereof. The elliptic springs may be centered by having the spring plank apertured as indicated at 24 to receive the retaining band 25 on the springs whereby said band rests directly on the spring plank seat portion 10, rather than on the spring plank. The upper band of the elliptic springs may be correspondingly inset into the bolster as indicated in Figure 3.

In order to avoid providing such a large supported area on the bolster and to facilitate insertion and removal of the bolster with respect to the associated side frames, each pair of transversely spaced helical springs units 22 is provided with a spring cap 26 straddling the springs and bridging the distance therebetween and extending over the reinforcements 13 of the frame. Said spring caps are desirably provided with downwardly opening pockets 27 receiving the upper ends of the springs 22 and assisting in properly centering the same on the associated spring plank 14. Each spring cap 26 is desirably provided with bolster guiding flanges 28 adapted to embrace the bolster guide columns and interlock the spring caps and associated bolster in proper relation with respect to the frame. In order to avoid the necessity of providing interlocking flanges on the bolster, provision is made for interlocking the bolster with respect to the spring caps rather than for interlocking the bolster directly with the bolster guide columns, although inner flanges 28′ may be employed on the bolster for limiting outward movement of said bolster with respect to the associated frame. For this purpose each spring cap 26 is formed with a centrally upstanding lug or boss 29 and the bolster is provided with a corresponding downwardly opening socket or pocket 30 receiving said boss and thereby securely locking the bolster in place.

In the present embodiment the elliptic springs 21 are shown of a free height greater than the corresponding height of the helical springs whereby, in order to properly receive said elliptic springs, the bolster is preferably upwardly offset or pocketed as indicated at 31 and the upper portions of said elliptic springs are received in said pocketed portion 31. The helical and elliptical springs are arranged so as to advantageously use all the available spring seating portion of the tension member while at the same time obviating the necessity of providing a bolster with an unduly large supported area. On account of having the supported area on the bolster relatively narrow transversely of the frame a normal amount of rocking between the bolster and the frame is adequately provided for.

Figure 5:
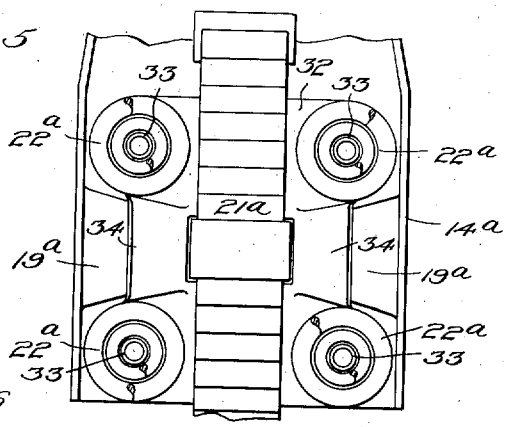
Figure 5 is a plan view of the spring plank and spring arrangement illustrated in Figure 4.

Referring now to the embodiment of our invention illustrated in Figures 4 and 5, a construction is there disclosed in which a frame $1^a$ of the double truss type, as heretofore described in detail in the Barrows Patent No. 1,652,808, previously referred to, is employed. A spring plank $14^a$ of a construction similar to that previously described in connection with the first embodiment is also used, the same being apertured beneath the single elliptic spring set $21^a$ for properly centering said set and upwardly corrugated as indicated at $19^a$ to cause the same to interlock with reinforcements $13^a$ on the side frame.

Instead of forming the spring plank with end flanges or gussets for properly centering the helical springs $22^a$ spring plates 32 both top and bottom are provided, said plates being desirably formed with spring centering collars 33 and upwardly corrugated or embossed as indicated at 34 to correspond with the corrugations $19^a$ on the spring plank, thereby properly interlocking the lower plate 32 and plank together.

In the present instance no spring caps are employed so that the bolster $15^a$ is provided with a correspondingly elongated spring supported portion and is likewise necessarily provided with some means for interlocking the same directly with the bolster guide columns $4^a$, said means in the present instance taking the form of guide flanges 35, the outer ones of which are of such a height that they are movable through those portions of the bolster opening $5^a$ which are widened beneath the bolster guiding portions of the guide columns. As in the previous embodiment, the lower surface of the bolster is preferably upwardly offset for receiving the elliptic spring and the upper spring plate 32 is preferably apertured like the lower spring plate so that the elliptical spring directly supports the bolster. Except as specifically described the present embodiment may correspond substantially with that of the first embodiment.

Figure 6:
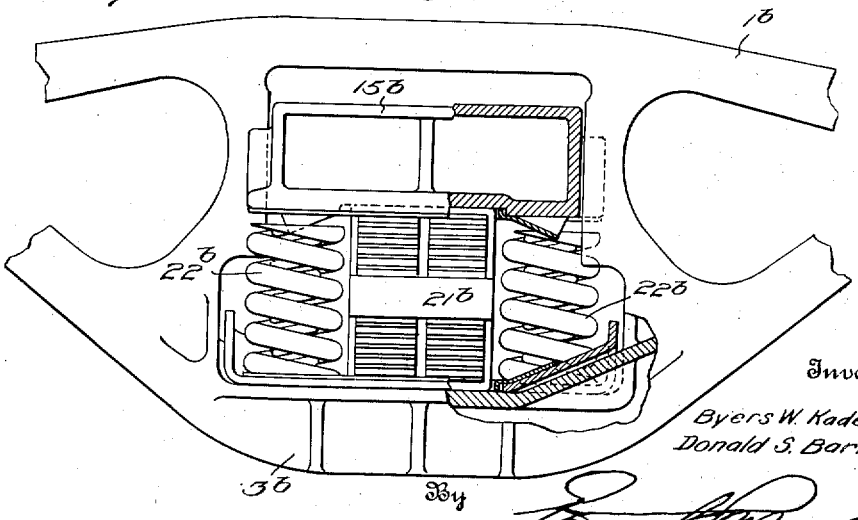
Figure 6 is a view corresponding to Figure 4, except that a pair of transversely disposed elliptic spring sets are employed rather than one set and the helical or coil springs are so short that they do not come into action until the elliptic or leaf springs have been somewhat compressed.

Referring now to the embodiment of our invention illustrated in Figure 6, a construction is there disclosed which may be identical, or substantially identical, with that of the embodiment illustrated in Figures 4 and 5, except that a plurality or pair of elliptical spring sets $21^b$ are employed thereby giving an increased elliptic spring capacity and the helical springs $22^b$ are of such a reduced height that they do not come into play until the elliptic springs have been compressed a predetermined amount, thereby providing a reserve capacity for supporting the associated bolster $15^b$ on the tension member $3^b$ of the frame $1^b$.

Figure 7:
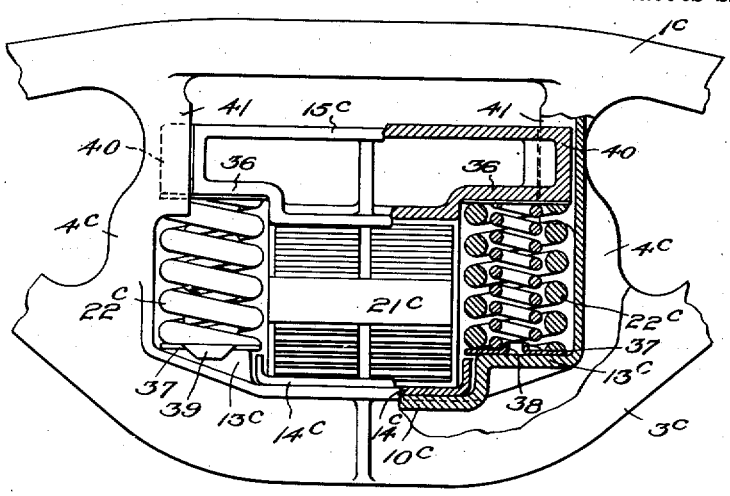
Figures 7 and 8 are views corresponding, respectively, to Figures 4 and 5 but showing a modification in which two transversely arranged leaf springs are employed with two longitudinally disposed coil spring units, the latter of which rest on pedestals or elevated portions of the spring plank seat.
Figure 8:
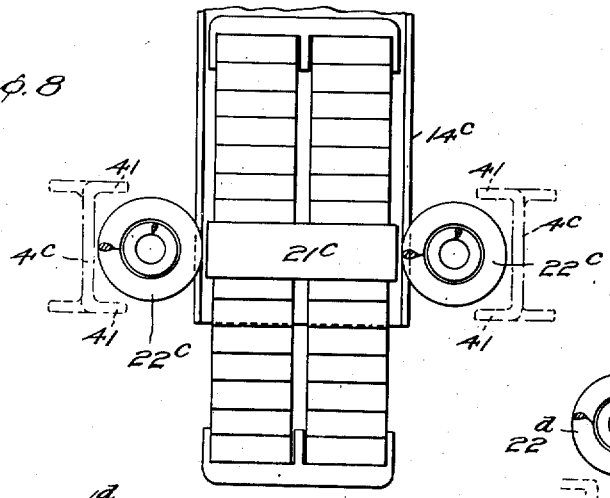

Referring now to the embodiment of our invention illustrated in Figures 7 and 8, a construction is there disclosed in which a different type of frame $1^c$ is utilized, said frame being of a type in which the spring supporting portion or web $10^c$ of the tension member $3^c$ is on two different levels, that is, a main spring supporting level and pedestals or upwardly embossed spring supporting portions $13^c$ adjacent each bolster guide column $4^c$. The purpose of providing auxiliary raised spring supporting portions $13^c$ is to avoid unduly extending the horizontal portion of the tension member beneath the bolster guide columns, while at the same time avoiding decreasing the depth thereof where the outer or auxiliary springs are supported.

In the present embodiment we employ two sets of elliptic springs $21^c$ disposed transversely of the frame as in the previous embodiments, said sets resting directly on a relatively narrow spring plank $14^c$, said spring plank being in the present embodiment shown straight and not interlocking with the upwardly embossed or raised portions $13^c$ of the spring supporting portion, but, as will be obvious, the same may, if desired, be arranged to interlock with said portions. The bolster $15^c$ is formed to not only rest on the elliptic springs $21^c$ but is provided with upwardly offset side portions 36 which are supported on the auxiliary helical springs $22^c$ which in turn rest on the raised spring supporting portions or pedestals $13^c$. Spring plates 37 are desirably provided for the helical springs $22^c$ for properly retaining them in position, the lower spring plates, as illustrated, being each provided with a spring centering collar 38 and depending flanges 39 adapted to embrace the associated pedestal $13^c$ and hold the plate in place. Longitudinal movement of the plates is limited by the adjacent bolster guide column on one side and the elliptic springs on the other. It will be noted that the bolster guide columns $4^c$ are so formed that the upper ends of the helical springs $22^c$ and associated upper spring plates are embraced between the side portions thereof and the bolster $15^c$, instead of being provided with flanges interlocking with and embracing the bolster guiding portions of the columns is rather provided with a lug 40 on each side thereof fitting between the bolster guiding flanges 41 on the associated bolster guide column. The details of construction not specifically described may correspond substantially with those of the previous embodiments.

Figure 10:
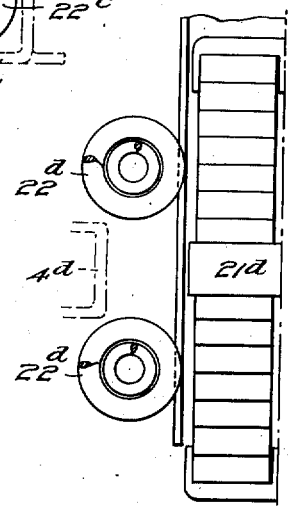
Figures 9 and 10 are fragmentary views corresponding to Figures 7 and 8, respectively, except that two elevated coil springs are employed on each side of the leaf springs straddling the columns instead of being placed partly inside the same.
Figure 9:
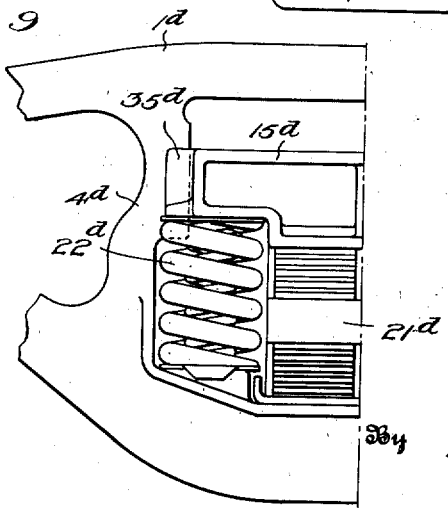

Referring now to the embodiment of our invention illustrated in Figures 9 and 10, a construction is there disclosed which may be identical with that of the embodiment illustrated in Figures 7 and 8, except that instead of having only one elevated coil spring on each side of the leaf spring sets there are two elevated coil springs sets $22^d$ on each side of the elliptic sets $21^d$, said coil springs straddling or being disposed on opposite sides of the bolster guide columns $4^d$ instead of being embraced thereby. The bolster $15^d$ is of the conventional type provided with flanges $35^d$, as shown in Figure 9, embracing the bolster guide portions of the columns $4^d$ and holding the bolster in proper assembled relation with respect to the frame $1^d$. Except as specifically described the construction of the present embodiment may correspond with that of the modification illustrated in Figures 7 and 8.

Figure 11:
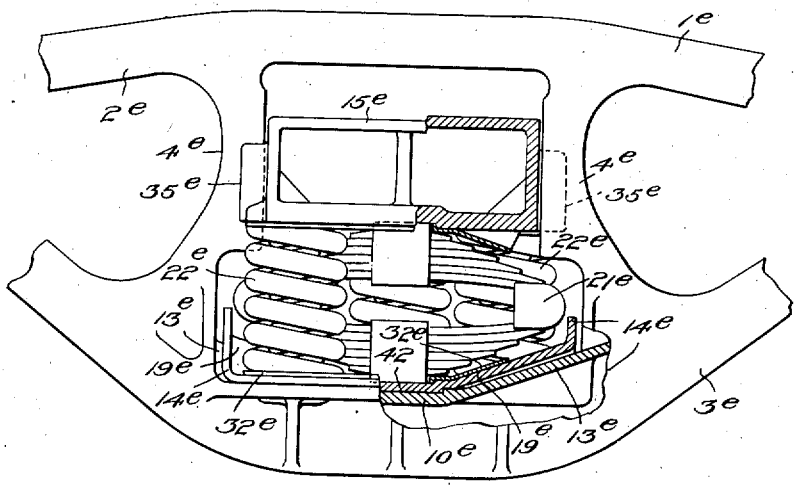
Figures 11 and 12 are views corresponding, respectively, to Figures 4 and 5 but showing a still further modification in which the leaf spring set is disposed longitudinally of the frame and three coil spring units are positioned on either side of said leaf spring set.
Figure 12:
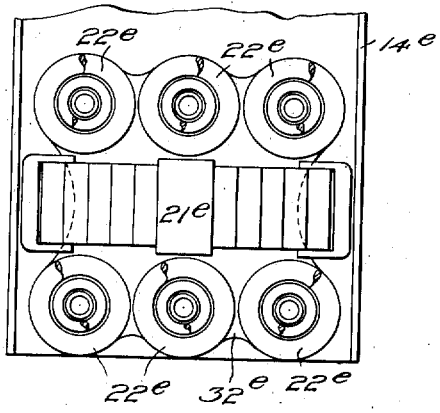

Referring now to the embodiment of our invention illustrated in Figures 11 and 12, a construction is there disclosed involving a side frame $1^e$ of the double truss type, as illustrated in Figures 1 to 6, inclusive, said frame having a compression member $2^e$, a tension member $3^e$, and bolster guide columns $4^e$. As in the embodiment illustrated in Figures 4 and 5, only one elliptic spring set $21^e$ is employed but said spring set is disposed longitudinally of the frame rather than transversely thereof, the ends of said elliptic springs extending over the reinforcing portions $13^e$ between the spring supporting portion $10^e$ of the tension member $3^e$ and the bolster guide columns $4^e$ and thereby overlying portions of the upper web of the tension member which would not be suitable for supporting springs anyway.

As in the previous embodiments, the spring plank $14^e$ is corrugated to correspond with the reinforcements $13^e$ as indicated at $19^e$ so that said plank interlocks with the frame by having portions nesting with the corrugations $13^e$. In the present embodiment the spring plank is formed with a downwardly offset central portion 42 fitting in a correspondingly depressed portion in the upper web of the tension member and a spring plate $32^e$ is employed which is corrugated to correspond with the spring plank $14^e$, thereby interlocking the same in place with respect to said plank. The spring plate $32^e$ is perforated to permit the elliptic springs or the retaining band therearound to rest directly on the plank, whereby said springs are properly centered. The upper spring plate is similarly formed for convenience of manufacture and the bolster is upwardly offset to cause said plate and the elliptic spring set to interlock therewith.

On opposite sides of the elliptic spring set $21^e$ are two longitudinally disposed rows of helical spring units $22^e$, said spring units resting on the spring plank or the lower spring plate and assisting the elliptic springs in supporting the bolster $15^e$. Said bolster is formed with a sufficiently extended lower surface for engaging not only the top of the elliptic spring set but also the tops of the six helical spring units, as illustrated in the present embodiment. As in the previous embodiment, the bolster is preferably provided with outstanding guiding flanges $35^e$ embracing the bolster guiding portions of the columns and of a height sufficiently reduced to permit removal and insertion of said bolster, as will be understood. The details of construction not specifically described may correspond substantially with those described in connection with previous embodiments.

From the foregoing description of our invention, taken in connection with the accompanying drawings, it will be seen that we have devised a novel form of truck which is admirably adapted for use with locomotive tenders, because provision for greatly increased capacity is made and elliptic springs as conventionally used on tender trucks are employed in part. Although some specific embodiments have been illustrated, we do not wish to be limited to the details as various changes may be made therein without departing from the spirit and scope of our invention as defined by the appended claims. From the specific embodiments illustrated and described, it will be apparent that we contemplate not only using elliptic springs disposed transversely of the frames but also longitudinally thereof and that one or a plurality of elliptic spring sets may be employed with two or more helical spring sets disposed on opposite sides of the elliptic spring set or sets. Said helical spring sets may be arranged to either directly support the associated bolster, or spring caps or yokes may be employed with said springs, which in turn support the bolster and, if desired, provide for interlocking the same with respect to the frame. The elliptic springs may be centered with respect to the associated members by fitting into apertured portions or pockets and the helical springs may be centered in a conventional manner as by means of centering collars on associated spring plates, or embracing flanges on the spring plank. The bolster if not locked in place by associated spring caps may have either a plurality of flanges embracing the associated bolster guiding portions of the columns or the construction may be reversed by providing guiding flanges on the columns which embrace the corresponding bosses on the bolster. Although a preferred construction involves the employment of double truss side frames or frames constructed in accordance with the Barrows Patent No. 1,652,808, referred to, it will be apparent that our invention is not limited to such use, for as illustrated particularly in Figures 7 to 10, inclusive, a frame of a different type may be employed and it will be obvious that other types of frames may likewise be employed while still obtaining some of the benefits of the invention.

Although the appended claims define an invention in a car truck, it is obvious that the term "car truck" includes tender trucks, and is not limited to specific types of railway rolling stock, but broadly embraces them all.

Having now described our invention, we claim:

1. In a railway truck, in combination, a side frame formed with compression and tension members spaced at intermediate portions thereof by bolster guide columns leaving a bolster opening therebetween, the tension member beneath the bolster opening being formed with a spring supporting portion, and a nest of springs supported by said portion and comprising an elliptic spring and helical springs for supporting the bolster load, said spring supporting portion being laterally extended to underlie the bearing portions of said springs.

2. In a railway truck, in combination, a side frame comprising compression and tension members spaced at intermediate portions thereof by bolster guide columns leaving a window opening therebetween, that portion of the tension member beneath the window opening being laterally widened with the junction between it and the bolster guide columns reinforced by upwardly embossed portions, and a nest of springs supported on said portion of the tension member said springs comprising elliptic springs disposed between said embossed portions and helical springs disposed on opposite sides of said elliptic springs adjacent said embossed portions.

3. In a railway truck, in combination, a side frame comprising a compression member, a tension member, bolster guide columns interposed therebetween and spaced to leave a window opening, that portion of the tension member beneath the window opening being formed for supporting a nest of springs and reinforced with respect to the bolster guide columns by upwardly extending embossments between the ends of said portions and said bolster guide columns, said embossments lying along the longitudinal center line of the frame, elliptic bolster supporting springs positioned on said spring supporting portion of the tension member between said embossments, and helical springs positioned on opposite sides of said elliptic springs and embossments for supporting an associated bolster.

4. In a railway truck, in combination, a side frame comprising a compression member, a tension member, bolster guide columns spacing intermediate portions of said members and leaving a window opening therebetween, that portion of the tension member beneath the window opening being formed with embossments extending from the ends thereof to the bolster guide columns, a spring plank supported on said tension member and formed with corrugations interlocking with the embossments to maintain said plank in proper relation with respect to the frame, and a nest of springs supported on said plank and comprising elliptic springs disposed adjacent the center line of said plank, and helical springs disposed adjacent the sides of said plank and said corrugations.

5. In a railway truck, in combination, a side frame comprising a compression member, a tension member, bolster guide columns spacing intermediate portions of said members and leaving a window opening therebetween, that portion of the tension member beneath the window opening being formed with embossments extending from the ends thereof to the bolster guide columns, a spring plank supported on said tension member and formed with corrugations interlocking with the embossments to maintain the plank in proper relation with respect to the frame, a nest of springs supported on said spring plank and comprising an elliptic spring set disposed on the center line of the spring plank, and a plurality of helical spring sets disposed adjacent the sides of the spring plank and on opposite sides of the corrugations therein.

6. In a railway truck, in combination, a side frame formed with compression and tension members spaced at intermediate portions thereof by bolster guide columns leaving a bolster opening therebetween, the tension member beneath the bolster opening being formed with a spring seating portion adapted to support a nest of springs comprising an elliptic spring set resting on the central portion of said spring seating portion and helical springs disposed on opposite sides thereof and on either side of the longitudinal center line of the frame, said spring seating portion being reinforced by web portions extending upwardly and outwardly therefrom on either side of the elliptic spring set.

7. In a railway truck, in combination, a side frame comprising compression and tension members spaced at intermediate portions, thereof by bolster guide columns leaving a window opening therebetween, that portion of the tension member beneath the window opening being laterally widened for supporting a nest of springs comprising an elliptic spring set disposed transversely of the frame and four helical spring sets disposed as two transversely spaced pairs of spring sets on either side of said elliptical spring set.

8. In a railway truck, in combination, a side frame comprising a compression member, a tension member, bolster guide columns interposed therebetween and spaced to leave a window opening, that portion of the tension member beneath the window opening being formed for supporting a nest of springs and reinforced by inclined portions extending upwardly and outwardly from intermediate springs of said nest of springs toward the ends of the frame, said spring seat portion being extended longitudinally of the frame in a substantially horizontal plane to provide for supporting the end springs of said nest of springs, helical springs supported on said extended portion of the spring plank seat portion, and elliptic springs supported on the intermediate portion thereof between the inclined reinforcing portions.

9. In a railway truck, in combination, a side frame formed with compression and tension members spaced at intermediate portions thereof by bolster guide columns leaving a bolster opening therebetween, the tension member beneath the bolster opening being formed with a spring seating portion and a nest of springs seated on said spring seating portion and comprising elliptic springs supported on the intermediate portions of said spring seating portion, and helical springs supported on opposite sides of said elliptic springs, spring caps resting on the tops of pairs of helical springs, and a bolster supported on said elliptic springs and the spring caps over said helical springs and formed with portions interlocking with said spring caps.

10. In a railway truck, in combination, a side frame comprising compression and tension members spaced at intermediate portions thereof by bolster guide columns leaving a window opening therebetween, that portion of the tension member beneath the window opening being laterally widened with the junction between it and the bolster guide columns reinforced by upwardly embossed portions, a nest of springs seated on said portion of the tension member, said springs comprising elliptic springs disposed between said embossed portions and helical springs disposed on opposite sides of said elliptic springs and embossed portions, spring caps supported on the pairs of helical springs positioned on opposite sides of said embossed portions and bridging the space above said portions and a bolster supported on said spring caps and elliptic springs.

11. In a railway truck, in combination, a side frame comprising a compression member, a tension member, bolster guide columns spacing intermediate portions of said members and leaving a window opening therebetween, that portion of the tension member beneath the window opening being formed with embossments extending upwardly in the angles between the ends thereof and the bolster guide columns, a spring plank supported on said tension member and formed with corrugations interlocking with the embossements to maintain the plank in proper relation with respect to the frame, a nest of springs supported on said plank and comprising elliptic springs disposed adjacent the center line of said plank, helical springs disposed adjacent the sides of said plank and said corrugations, spring caps bridging pairs of helical springs and the corrugations therebetween and formed with bolster guide portions interlocking with the bolster guide columns, and a bolster supported on said elliptic springs and spring caps and formed with portions interlocking with said spring caps.

12. In combination with a side frame having a bolster opening and a spring supporting portion therebeneath, a nest of bolster springs supported by said portion and formed as a set of elliptic springs with helical springs arranged on either side thereof.

13. In combination with a side frame having a bolster opening, a nest of bolster springs comprising elliptic springs and spaced helical springs disposed on opposite sides thereof.

14. In a railway truck, in combination with a side frame, a nest of springs comprising elliptic springs and helical springs disposed on opposite sides thereof and arranged at a higher elevation.

15. A bolster formed with a centrally disposed offset portion for receiving an elliptic spring set and portions on either side thereof for resting on helical springs.

16. A bolster comprising an upwardly offset portion for resting on and receiving an elliptic spring set and depending portions on opposite sides thereof for resting on and interlocking with associated spring caps adapted to be supported by helical springs.

17. A spring plank formed with corrugations at the sides thereof near the ends for interlocking with corresponding embossments on an associated side frame and an aperture between said embossments for permitting an associated elliptic spring set to rest directly on the side frame whereby it is properly centered with respect to said plank.

18. In a railway truck, in combination, a side frame formed with compression and tension members spaced at intermediate portions thereof by bolster guide columns leaving a window opening therebetween, the tension member beneath the window opening being formed with a spring supporting portion, and a nest of springs supported by said portion and disposed in said window opening directly above said tension member, said nest comprising elliptic springs and helical springs, said helical springs being of such a height that they do not come into action until the elliptic springs have been stressed a predetermined amount.

19. In a railway truck, in combination, a side frame formed with compression and tension members spaced at intermediate portions thereof by bolster guide columns leaving a bolster opening therebetween, the tension member beneath the bolster opening being formed with a spring seating portion and a nest of springs seated on said spring seating portion and comprising elliptic springs and helical springs for supporting the bolster load, said elliptic springs being arranged with their axes transverse to the plane of said side frame.

20. In combination with a side frame having a bolster opening and a spring supporting portion, the side walls of said bolster opening and said spring supporting portion being formed as an integral casting, and bolster springs supported by said spring supporting portion, said bolster springs comprising a set of elliptic springs and a set of helical springs, one of said sets intervening between the springs of the other set.

21. A spring nest adapted for insertion in the bolster opening of a railway vehicle side frame comprising a set of helical springs and a set of elliptic springs, one of said sets intervening between the springs of the other set.

BYERS W. KADEL.
DONALD S. BARROWS.